UNITED STATES PATENT OFFICE 2,396,580

METHOD FOR PREPARATION OF OXY-PHENYL-AMINO-PROPANE AND ITS DERIVATIVES

Fritz Külz, Frankfort-on-the-Main, Germany; vested in the Alien Property Custodian No Drawing. Application November 19, 1941, Serial No. 419,811. In Germany June 25, 1940

3 Claims. (Cl. 260—570.8)

This invention refers to the preparation of a class of chemical compounds which are chemically denominated as oxyphenyl-amino-propanes. These compounds comprise not only the individual compound, namely, the oxyphenyl-amino-propane itself which exists in two isomers, namely, the 1-oxyphenyl-2-amino-propane and the 2-oxyphenyl-1-amino-propane but also a number of substitution products. Thus, at least one of the hydrogen atoms of the phenyl rest may be substituted by a lower molecular alkoxyl group or by a lower molecular alkyl group or another lower molecular radical. Furthermore, in the propane chain, at least one of the hydrogen atoms may be substituted by a lower molecular alkyl radical. Finally, in the amino group, at least one of the hydrogen atoms may be substituted by a lower molecular alkyl or alkylene radical or by an aralkyl, aralkylene, aryl, clycloalkyl, cycloalkylene radical or the tetramethylene or the pentamethylene rest.

Accordingly the compounds have the general formula:

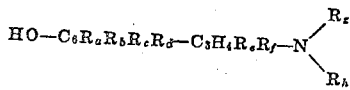

Any one of the radicals designated by $R_a$ to $R_d$ may be, in optional sequence, either the hydrogen atom or the alkoxyl group or the alkyl group. Preferably the alkoxyl groups and the alkyl groups are the lower homologues, and contain at most four C atoms. The methyl, the ethyl, propyl, isopropyl, butyl group and the corresponding alkoxygroups are examples of these radicals.

Any one of the radicals denominated as $R_e$ and $R_f$ may be either hydrogen or a lower molecular alkyl, preferably with at most four C atoms, for example methyl, ethyl, propyl, isopropyl, butyl, etc. $R_g$ and $R_h$ mean hydrogen or alkyl, or alkylene or aralkyl or aralkylene or aryl or cycloalkyl or cycloalkylene or the tetramethylene or the pentamethylene rest or another polymethylene rest by which one or both of the free nitrogen valences may be bound. The alkyl or alkylene group contains preferably not more than six C atoms, the aralkyl and aralkylene radicals are the phenyl group with a saturated or unsaturated side chain of at most four C atoms, and the cycloalkyl and cycloalkylene groups are respectively the fully and partially hydrogenated phenyl group, in which one or more hydrogen atoms are substituted or not by methyl, ethyl, propyl, isopropyl or butyl or similar low molecular alkyls.

Hitherto compositions of the type referred to have been prepared from the corresponding alkoxy-compounds for example from the methoxy-compound, by splitting off alkyl (methyl) and converting thus the said alkoxyl group into the hydroxyl group.

According to the present invention, as initial substances the oxyphenyl-propylene otherwise denominated as oxy-allyl-benzol and its substitution products are used which often are ingredients of ethereal oils, for instance the chavicol or the eugenol, or can be easily obtained by synthesis, for example the 3,5-dimethoxy-4-oxy-allyl-benzol or the 3,5-diethoxy-4-oxy-allyl-benzol. All these initial substances are of the general formula:

in which $R_a$ to $R_d$ may be either hydrogen or a lower molecular alkoxyl group or a lower molecular alkyl group and in which $C_3H_3R_eR_f$ may be the propylene (allyl) radical or a mono- or bi-alkyl substituted isopropylene with the double bond at the free end of the chain.

The initial substance is treated by hydrogen halogenide which is attached to the double bond of the allyl radical. The obtained products are converted into the amines by treatment with ammonia or a primary or a secondary amine; accordingly $R_g$ and $R_h$ may be either hydrogen or an alkyl, an alkylene, an aralkyl, an aralkylene, an aryl, a cycloalkyl or a cycloalkylene group. $R_g$ and $R_h$ may also be linked together in an annular configuration for example by tetramethylene or pentamethylene or another polymethylene. Examples of substances capable of this reaction are ammonia or primary amines for example methyl amine or ethylamine or aniline or toluidine or xylidine or their partially or totally hydrogenised derivatives or benzylamine or secondary amines like dimethyl amine or diethyl amine or methyl-ethyl-amine or methyl-isopropyl amine or diphenyl amine or methylaniline or dibenzylamine or piperidine or pyrolidine.

As to this addition of hydrogen halogenide to oxy-phenyl-allyl compounds, it could not be foreseen that the addition products were stable enough since corresponding addition products of the alkoxyl type, namely of the safrol, the eugenol methyl ether and the anethol, were described as very unstable and inclined to decomposition by splitting off hydrogen halogenide, even when they are distilled under reduced pressure (cf. German Patent 274,350). Hence it was surprising that the addition products obtained according to the invention are sufficiently stable, in spite of the free hydroxylic group of the phenyl radical which generally is most reactive and could not be expected to remain indifferent in this reaction.

Contrary to this expectation it could be stated that not only the addition of hydrogen halogenide takes place without difficulties but that it is also possible to distil the resulting addition products under reduced pressure. It was surprising, too, that the free hydroxylic group does not prevent or disturb the double decomposition of the addition product with ammonia or a primary or secondary amine.

Thus, according to the invention, it is possible to obtain oxyphenyl-alkylamines from easily available or obtainable products, merely by two steps namely by the addition of hydrogen halogenide and the subsequent substitution of the amino group in lieu of the halogen.

The initial substances which correspond to the general formula mentioned above may consist of different isomers but the hydroxyl group attached to the phenyl rest must be in the meta or para position to the allyl rest.

As to the hydrogen halogenide there may be used in the process either hydrochloric acid or hydrobromic or hydroiodic acid while hydrofluoric acid is of less importance particularly since the working with this substance is rather troublesome.

These acids are preferably employed in concentrated form and spontaneous heating should be prevented by suitable means for instance cooling down to the freezing point. To avoid undesired reactions or decompositions the intermediate product should be freed from the exceeding acid by suitable means for instance by washing with dilute alkali carbonate solution. After careful exsiccation the product may be further purified by distillation or rectification or any other suitable means before it is transformed into the amine by treatment with ammonia or a primary or secondary amine.

This second step of the process may be accelerated by increased temperature, for instance by boiling.

The final products may be purified by dissolving them in a dilute acid, and by extracting them with a suitable solvent, for instance ethylic ether, which dissolves the neutral ingredients. The product thus obtained may be distilled and rectified. By this operation the exceeding amine can be separated. In lieu of the rectification or additionally the purification may be obtained by crystallization as hereinafter set out.

The final product, i. e. the oxy-phenyl-aminopropane or its derivatives, is obtained in two different isomers, namely the 1-oxyphenyl-2-aminopropane and the 2-oxyphenyl-1-amino-propane; since, according to the conditions of working, the intermediate product corresponding to the formula

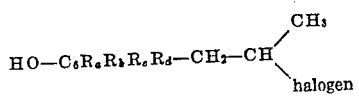

or its chain-substituted derivative is more or less transformed by the so-called pinacoline interchangement to a substance of the following formula

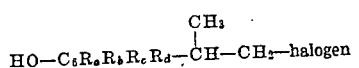

and its chain-substituted derivative respectively. The last mentioned isomer has often merely the character of an impurity and does not much impair the properties of the first mentioned compound. In cases where pure products and the isolation of the single isomers are desired this can be achieved by fractional crystallization, either of the intermediate product or of the final product when these are solid substances. When, however, the final product is a liquid it may be converted into a salt from which the isomers are separated by fractional crystallization. These salts are formed by mere addition of inorganic or organic acids; hydrochloric acid, hydrobromic acid, hydroiodic acid, sulphonic acid, perchloric acid and the corresponding acids of the other halogens, low molecular monobasic fatty or aromatic acids for example acetic acid or picric acid, oxyacids like lactic acid, and dibasic acids like oxalic, malonic, succinic acid and higher basic acids like citric acid, are found to be suitable for this purpose.

The salts of the two isomers show different solubility within suitable solvents so that it is possible to separate the isomers by mere crystallization.

The final products are of therapeutical value.

Further particulars of the invention may be seen from the following examples. The amounts are by weight.

*Example 1*

To one part of eugenol

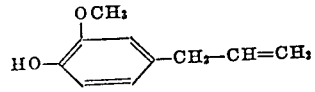

four parts of hydrochloric acid (sp. gr.=1.19) are added; the mixture is mechanically shaken during twenty-four hours at room temperature. Then the oily layer which is of dark green colour and consists mainly of the reaction product, is separated, washed with water, alkali bicarbonate solution and again with water and finally carefully dried by means of calcium chloride. The dried reaction product is then distilled under reduced pressure. The boiling point is 152° to 155° C./12 mm. The distilled product contains 16.90 per cent of chlorine which for the product $C_{10}H_{13}O_2Cl$ is calculated to 17.67 per cent.

10 parts of this addition product is then boiled for five hours under reflux with a solution of 10 parts of n-butylamine in 20 parts by volume of anhydrous ethyl alcohol. Then the alcohol and the exceeding amine is distilled off under reduced pressure; the residue is acidified with dilute hydrochloric acid and then extracted with ethylic ether to remove neutral ingredients. Then ammonia is added to obtain the free amines which are extracted by ether. The ethereal solution is dried with sodium sulphate, whereupon the ether is vaporised. The residue which consists of the free amines is distilled under highly reduced pressure (0.05 mm. mercury). The fraction boiling between 120° and 125° C./0.05 mm. is dissolved in ethylic ether, and an ethereal solution of hydrochloric acid is added. The obtained chlorhydrate has the unsharp melting point of 128 to 132° C.

By repeated recrystallization from methanol a chlorhydrate of the melting point of 184 to 185° C. was obtained which was identified as the 2-(3-methoxy - 4 - oxy - phenyl) - 1 - n - butylaminopropane-chlorhydrate of the following formula $C_{14}H_{23}O_2N.HCl$

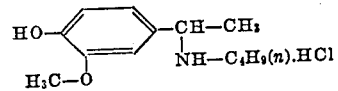

Analysis: Calculated, C 61.39, H 8.84, N 5.11. Found, C 61.28, 61.34; H 8.72, 8.75; N 5.29, 5.19.

For the purpose of identification the product was thoroughly methylated at the oxygen and nitrogen by treatment with dimethyl-sulphate and alkali; subsequently the quaternary salts are decomposed by Hofmann's method, and resulted in a product of the melting point 36–37° C. This product was identified as the pseudo eugenol-methyl ether by comparison with a product obtained according to the method of Béhal and Tiffeneau (Bull. Soc. Chim., France, IV, 3,732 (1908)) and by the mixing test with this product.

The formula of the pseudo eugenol methyl ether is:

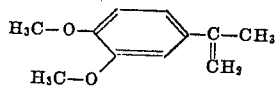

On concentration of the mother lye or on addition of ethylic ether an isomeric chlorhydrate is obtained which on repeated recrystallization shows the constant melting point of 135° to 136° C. This product treated by Hofmann's method mentioned above yields the iso-eugenol methyl ether of the formula

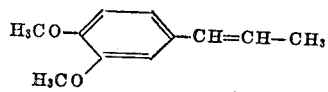

which was identified by the formation of the corresponding pseudo-nitrosite (M. P. 107° C.) and the mixing test with a product obtained by the method of Angeli (Ber. 24, 3996 (1891)) and of Wallach (Liebigs Ann. 332, 335 (1904)). The obtained chlorhydrate (M. P. 135° to 136°) is therefore the 1-(3-methoxy-4-oxyphenyl)-2-n-butylamino-propane-chlorhydrate of the formula

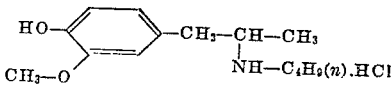

Analysis: Calculated, $C_{14}H_{23}O_2N \cdot HCl$, mol. wt. 273.7; C 61.39, H 8.84, N 5.11. Found, C 61.25, 61.42; H 8.76, 8.75; N 5.05, 5.07.

Example 2

34 parts hydrobromic acid (66 percent) are slowly added to 15 parts eugenol while a vigorous agitation is maintained and the reaction temperature is decreased to 0° C. by means of external cooling with a freezing mixture. Subsequently the reaction product is agitated or shaken for five to six hours and cooled with ice. Then one adds water, extracts with chloroform, washes the chloroformic solution with water, dilute sodium carbonate solution and again with water, and dries with calcium chloride. After vaporisation of the chloroform the addition product of hydrobromic acid to eugenol remains as an oily residue which can be distilled under reduced pressure without decomposition. B. P. 163°/10 mm. or 127 to 128°/0.5 mm.

This addition product is slowly poured into the fourfold amount of ethyl alcohol saturated with gaseous ammonia, whereby the ammonium salt is formed as a crystalline precipitate. Subsequently one shakes mechanically for two days, whereby the mixture becomes less consistent, and adds ethylic ether and filters off the precipitate.

This precipitate is kept during a sufficient time in a vacuum exsiccator which is filled with sulphuric acid, then dissolved in the ten-fold amount of water and boiled and bleached with animal coal. After filtration, ammonia is added to alkaline reaction. A basic substance is separated in crystalline condition which, after fractional distillation under reduced pressure (B. P. 167°/10 mm.) shows the melting point of 173° C. The corresponding chlorhydrate recrystallised from a mixture of methanol and ethylic ether melts at 267° C.

Analysis: Calculated for $C_{10}H_{15}O_2N$, mol. wt. 181.1, C 66.25, H 8.35, N 7.73. Found, C 66.45, H 8.37, N 7.54, 7.73.

The filtrate left after the separation of the precipitate is evaporated, the residue dissolved in ethylic ether and the ethereal solution dried with sodium sulphate; then the ether is vaporised, and the residue distilled under reduced pressure. The distillate (B. P. 172° C./12 mm.) may be converted into the corresponding chlorhydrate which after crystallization from a mixture of methanol and ethylic ether, melts at 229° to 230° C. The free amine melts at 147° to 148° C.

Analysis: Calculated for $C_{10}H_{15}O_2N$, mol. wt. 181.1; C 66.25, H 8.35, N 7.73. Found, C 66.33, H 8.31, N 7.51.

Which of these both isomers corresponds to the 1-(3-methoxy-4-oxyphenyl)-2-amino-propane and which to the 2-(3-methoxy-4-oxyphenol)-1-amino-propane was not verified.

Example 3

To 34 parts of n-butylamine 19.5 parts of the intermediate product obtained in the first step of the reaction described in the preceding example dissolved in anhydrous alcohol, are slowly added. The mixture is boiled for three hours under reflux. After vaporisation of the alcohol and the excess of the amine one adds hydrochloric acid, and extracts with ethylic ether to remove neutral substances. From the hydrochloric solution the amine is freed in the usual manner, and distilled under highly reduced pressure (B. P. 120° to 125°/0.05 mm.). The distillate is dissolved in ethylic ether and an ethereal solution of hydrochloric acid is added whereby the corresponding chlorhydrate is precipitated from which the single isomers may be obtained by crystallization from methanol. The isomers melt at 184° to 185° and 135° to 136° respectively, and are identical with those obtained according to Example 1. For the separation of the isomers, besides other inorganic and organic salts, the neutral salts of the succinic acid are particularly suitable. For this purpose the distilled amine is dissolved in a small amount of alcohol and mixed with succinic acid in the molecular relation of 2 to 1; then the solution of the salts is evaporated, and the residue is recrystallized from water. Firstly a succinate melting at 143° to 145° crystallises which after double recrystallization melts constantly at 150° to 151° C. This compound is the neutral succinate of the 1-(3-methoxy-4-oxyphenyl)-2-n-butylamino-propane which contains two molecules of water of crystallization, and is soluble in water with neutral reaction against phenol-phtaleine as indicator.

After considerable evaporation of the aqueous mother lye there crystallises the succinate of the isomeric 2-(3-methoxy-4-oxyphenyl)-1-n-butyl-amino-propane which, after recrystallization from water melts constantly at 99° to 100°. It contains 5 molecules of water of crystallization and is soluble in water with neutral reaction.

Analysis: Calculated for $(C_{14}H_{23}O_2N)_2 \cdot C_4H_6O_4$, mol. wt. 592.4; C 64.82, H 8.85. Found, C 64.34, H 9.04.

Example 4

10 parts of the addition product of hydrobromic acid to eugenol obtained in the first step of the process described in Example 2 are heated for two hours on the water-bath and under pressure with 10 parts of allyl amine dissolved in 25 parts by volume of anhydrous alcohol. The reaction product is obtained according to Example 1, and distilled under reduced pressure (B. P. 174° to 177°/12 mm.). The distillate which crystallises at ordinary temperature melts unsharply at about 150 to 151° C. The product was analysed without separation of the isomers.

Calculated for $C_{13}H_{19}O_2N$, mol. wt. 221.1; C 70.55, H 8.64, N 6.33. Found, C 70.58, H 8.69, N 6.39.

Formulas:

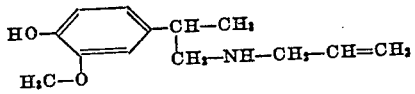

and

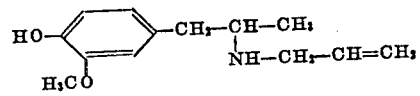

Example 5

To 12.2 parts of the intermediate product obtained by the first step of the process described in Example 2 and dissolved within 20 parts by volume of anhydrous alcohol, 22 parts of iso-amyl-amine are slowly added. A temperature of 70° to 80° C. is maintained for 2 to 3 hours. Then the alcohol and the excess of the amine is distilled off. By the same treatment described in Example 1 a reaction product is obtained which distils under reduced pressure at 187° to 189°/14 mm. The yield is 78 percent of the theory. For the purpose of separating the distillate into the isomers it is converted into the chlorhydrate derivative which is fractionally crystallised from a mixture of methanol and ether. The product which is more difficultly soluble melts constantly at 210° C.

Analysis: Calculated for $C_{15}H_{25}O_2N.HCl$, mol. wt. 287.7; C 62.57, H 9.11, N 4.87. Found, C 62.50, H 9.04, N 4.81.

The product which is more easily soluble melts at 156° C.

Analysis: Calculated for $C_{15}H_{25}O_2N.HCl$, mol. wt. 287.7; C 62.57, H 9.11, N 4.87. Found, C 62.58, H 9.06, N 4.91.

Example 6

30 parts of piperidine are added according to Example 3 to a solution of 20 parts of the intermediate product obtained in the first step of the process described in Example 2. After the reaction is completed the crystallised piperidine chlorhydrate is separated from the alcoholic solution by filtration. The alcohol and the excess of the piperidine are vaporised under reduced pressure and the residue treated as in the foregoing examples. On concentration of the ethereal solution firstly an isomer crystallises having the unsharp melting point of 130° to 131° which, after recrystallization from alcohol melts constantly at 131° to 132° C. The corresponding picrate melts constantly after recrystallization from alcohol at 182° to 183° C., the corresponding chlorhydrate at 213° to 214° C.

Analysis: Calculated for $C_{15}H_{23}O_2N$, mol. wt. 249.2; C 72.23, H 9.31. Found, C 72.26, H 9.17.

The ethereal mother lye is completely evaporated, and the residue is heated under reduced pressure to remove the remaining traces of piperidine. Then the residue is dissolved in a small amount of alcohol; by repeated crystallization from alcohol a further isomer is obtained which melts at 89° to 90° and whose picrate and chlorhydrate melt at 130° to 132° and 150° to 152° respectively.

Analysis: Calculated for $C_{15}H_{23}O_2N$, mol. wt. 249.2; C 72.23, H 9.31. Found, C 72.25, H 9.29.

The formulas are:

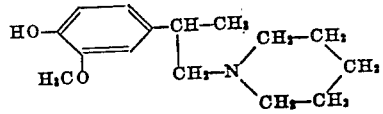

and

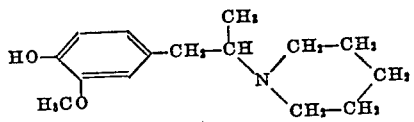

Example 7

16 parts of pure chavicol are treated according to Example 2 with 44 parts hydrobromic acid (66 per cent). The obtained addition product boils under highly reduced pressure at 110° to 115°/0.5 mm.

Analysis: Calculated for $C_9H_{11}OBr$, mol. wt. 215.0; Br 37.17. Found, Br 37.04.

10 parts of this addition product are boiled for three hours and a half under reflux with 17 parts of n-butyl amine dissolved in 20 parts by volume of anhydrous alcohol. The reaction product is purified like in the foregoing examples, and distilled under highly reduced pressure (B. P. 167° to 170° C./0.05 mm.).

For the purpose of separating the isomers the distillate is dissolved in ethylic ether and precipitated with lactic acid. The obtained lactates are crystallised from a mixture of anhydrous alcohol and ethylic ether. The crystallised less soluble lactate melts at 135° to 136° C.

Analysis: Calculated for $C_{13}H_{21}ON$, mol. wt. 297.2; C 64.60, H 9.16. Found, C 64.68, H 9.12.

From the mother lye the amine is preferably freed and converted into the bromhydrate which is crystallised from a small amount of water. From the part which is easily soluble in water the free amine is obtained which is subsequently converted into the lactate which is recrystallised from a mixture of alcohol and ether (M. P. 94° to 95° C.). It contains one molecule of water of crystallization of which one half is split off under highly reduced pressure.

Analysis: Calculated for

mol. wt. 396.2; C 62.71, H 9.22. Found, C 62.30, 62.38; H 9.21, 9.22.

The two isomers correspond to the following formulas:

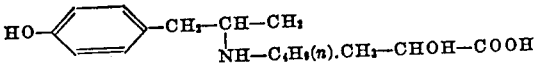

and

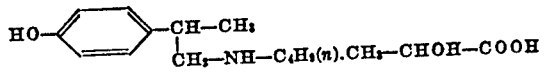

Example 8

47 parts of 3,5-dimethyl-4-oxy-1-allyl-benzol are treated with hydrobromic acid according to Example 2, but maintaining the temperature at about +3° C. to prevent congealing of the reaction mass. The purified reaction product boils without decomposition at 165° to 168°/11 mm. At ordinary temperature it becomes solid.

To 10 parts of this addition product which are dissolved in 20 parts by volume of anhydrous alcohol, 10 parts of diethyl amine are added whereby a spontaneous increase of temperature is observed. After twelve hours the reaction product is purified as described in the foregoing examples. The mixed isomers of the amines boil at 157° to 160°/10 mm. By addition of hydrochloric acid dissolved in ether the chlorhydrates are obtained whose less soluble part crystallised from methanol, melts at 217° C.

Analysis: Calculated for $C_{15}H_{25}ON.HCl$, mol. wt. 271.7; C 66.26, H 9.64; found, C 66.30, H 9.63.

The more soluble isomer was not isolated.

The isomers correspond to the following formulas:

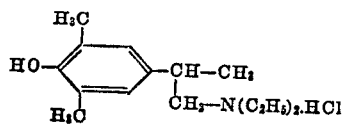

and

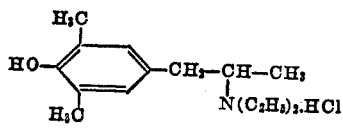

Example 9

30 parts of utmost concentrated hydroiodic acid are added to 10 parts of eugenol at room temperature and under permanent agitation. Subsequently the reaction mass is agitated for five hours and then mixed with water. The separated oily layer is diluted with chloroform, and this solution washed with sulphurous acid, water, a solution of sodium bicarbonate and again with water and finally dried with calcium chloride. The solution is evaporated. After the vaporisation of unchanged eugenol the residue boils under highly reduced pressure at 130° to 135° C./0.3 mm.

The further operation corresponds to the method described in Example 1, and finally two isomers of n-butylamino-derivatives are obtained.

What I claim is:

1. In the process of preparing hydroxyphenyl-amino-propane compounds, the steps which comprise treating one of the group of compounds consisting of eugenol and chavicol with a hydrogen halide, boiling the addition product under reflux with an amine in an aqueous volatile solvent and purify the resulting product.

2. A method according to claim 1 comprising the step of converting the final product into a salt by treatment with an acid and separating the salts of the isomers by fractional crystallization of said salt.

3. In the process of preparing hydroxy-phenyl-propane compounds the steps which comprise treating chavicol with a hydrogen halide, extracting the product with an organic volatile solvent, aminolizing and crystallizing, adding lactic acid, dissolving in volatile solvent and fractionally recrystallizing yielding lactates of the two isomeric amines of phenyl amine.

FRITZ KÜLZ.